United States Patent [19]

Wilson

[11] Patent Number: 4,632,015
[45] Date of Patent: Dec. 30, 1986

[54] TANDEM BRAKE BOOSTER

[75] Inventor: Robert K. Wilson, Granger, Ind.

[73] Assignee: Allied Corporation, Morristown, N.J.

[21] Appl. No.: 665,847

[22] Filed: Oct. 29, 1984

[51] Int. Cl.[4] ............................................... F15B 9/10
[52] U.S. Cl. .................................... 91/376 R; 91/534;
92/50; 74/102
[58] Field of Search ...................... 92/50, 69 R, 75, 64,
92/76; 91/534, 376 R, 170 R; 74/107, 102, 74,
516, 518

[56] References Cited

U.S. PATENT DOCUMENTS

| | | | |
|---|---|---|---|
| 1,530,227 | 12/1922 | Bourassa | 74/107 |
| 2,575,665 | 11/1951 | Kilpela | 74/107 X |
| 4,387,626 | 6/1983 | Meyers | 92/50 |
| 4,475,439 | 10/1984 | Meyers | 92/50 |
| 4,512,237 | 4/1985 | Endoh et al. | 91/369 A |

Primary Examiner—Robert E. Garrett
Assistant Examiner—Mark A. Williamson
Attorney, Agent, or Firm—Leo H. McCormick, Jr.; Ken C. Decker

[57] ABSTRACT

A tandem brake booster having first and second lever arms for transferring an output force from a second wall into an output member in response to an input signal being applied to a control member. A first cam surface on each lever arm engages an annular fulcrum member and a second cam surface engages the output member. The engagement of first and second cam surfaces on the fulcrum and output member direct said output force from said second wall into said control member along a force vector substantially parallel to the output member without the introduction of rotational forces on a first wall.

6 Claims, 4 Drawing Figures

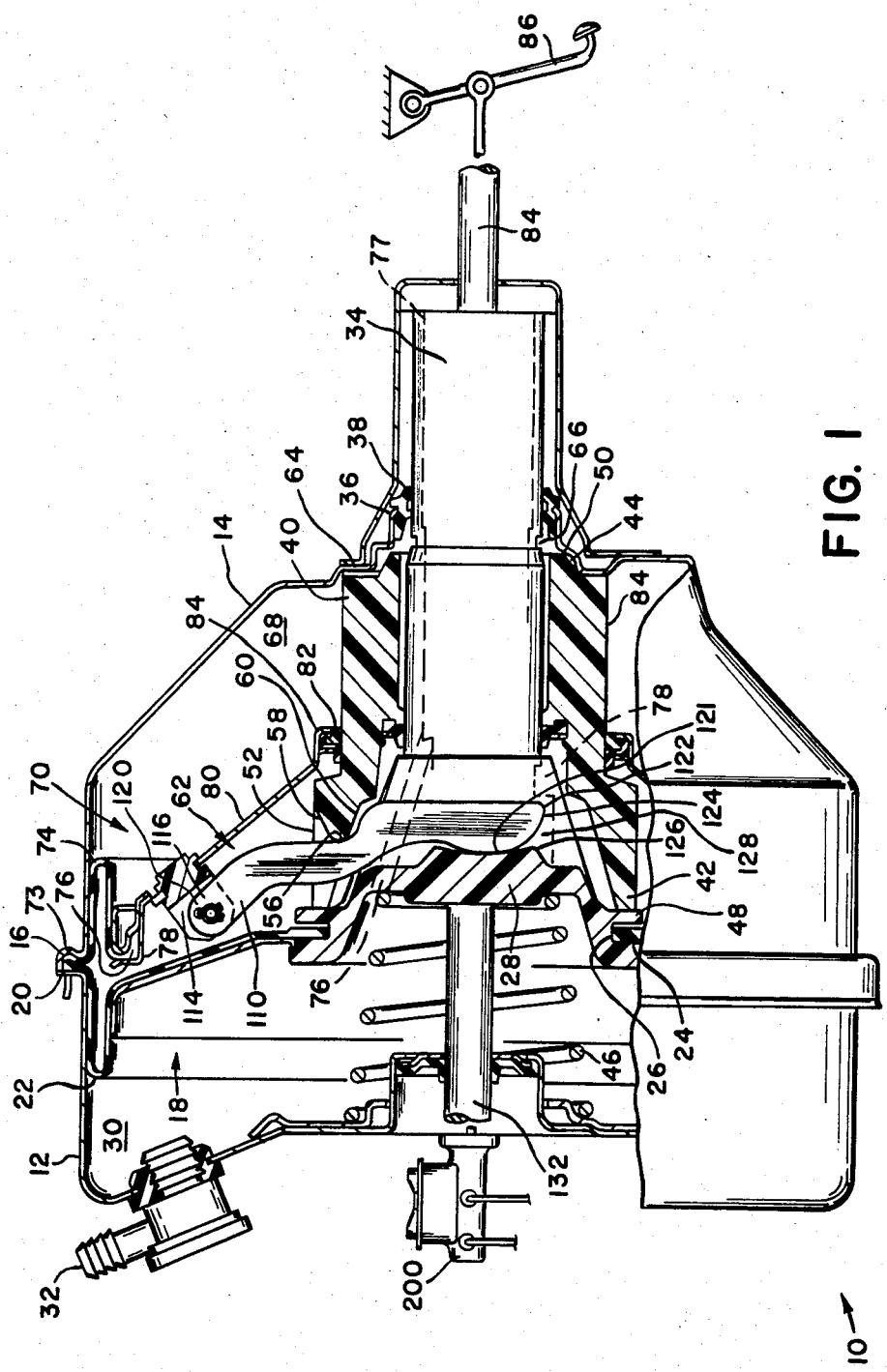

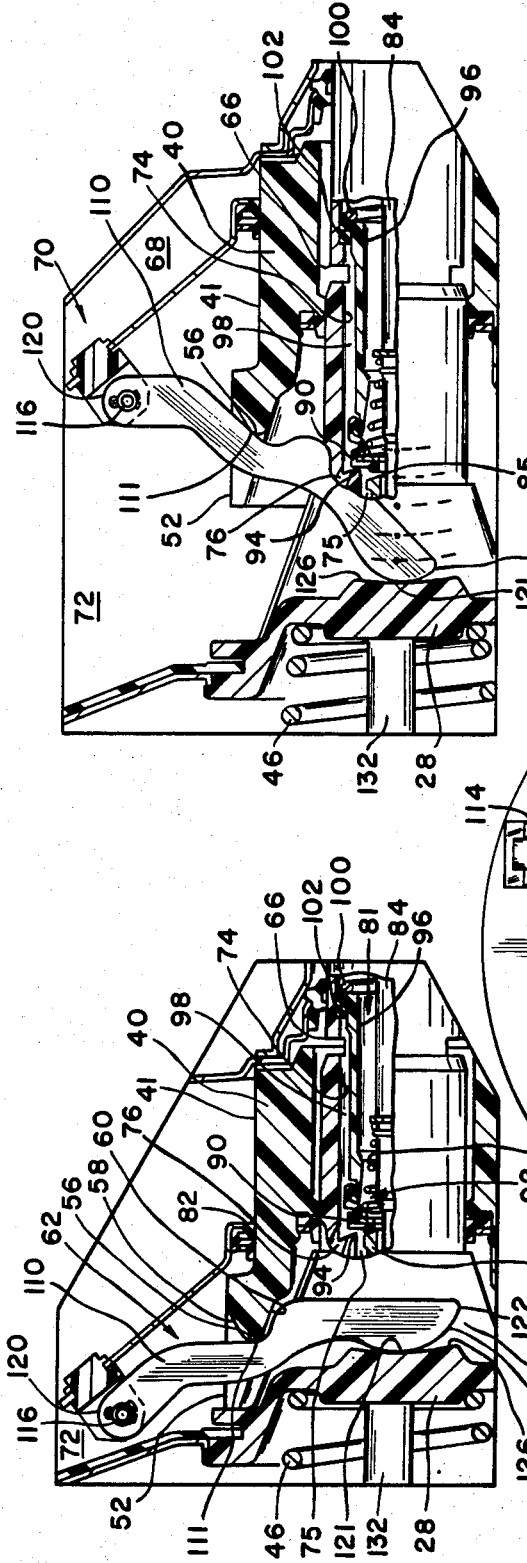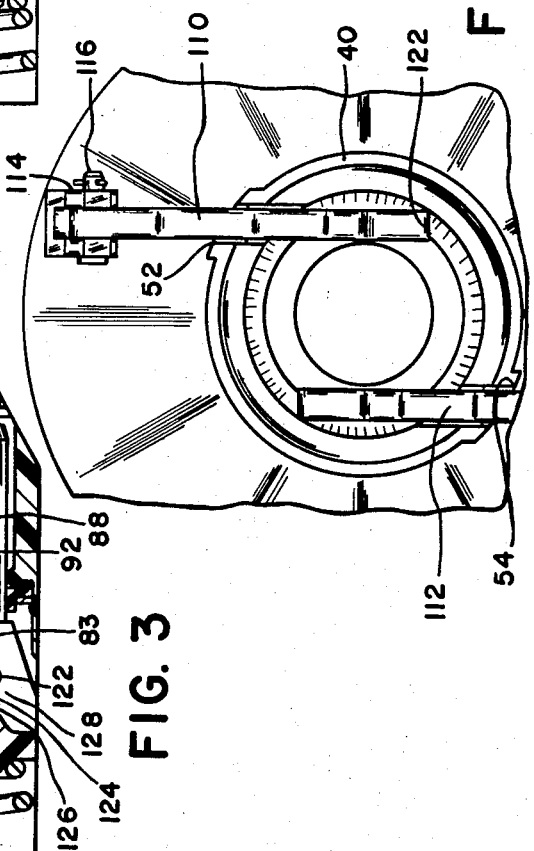

TANDEM BRAKE BOOSTER

This invention relates to a tandem brake booster having lever arms with cam surfaces thereon through which an output force from a secondary wall is transferred into an output member without the introduction of rotational forces to a primary wall.

In evaluation of the tandem brake booster disclosed in U.S. Pat. No. 4,387,626 and in an effort to simplify the construction thereof, it was observed that under some conditions the actual output force was less than the theoretical output force. On investigation it was found that the lever arms through which the output force from the secondary piston is transferred to the output member was introducing a rotative torque into the output member.

The tandem brake booster of the invention disclosed herein has first and second lever arms with cam surfaces thereon which engage cam surfaces on the output member. The output from the secondary wall is transferred to the output member along a force vector that is substantially parallel to the output member and as a result the introduction of rotatine forces to the output member are substantially eliminated.

An advantage resulting from this invention is that the actual output force generated by the tandem brake booster is substantially identical with the theoretical output force.

A further advantage of this invention occurs through the use of lever arms with cam surfaces thereon which engage similar cam surfaces on an output member to transfer an output force from a secondary wall into an output member along a substantially vertical vector plane to eliminate the introduction of forces therein that may rotate the output member.

It is an object of this invention to provide a tandem brake booster with lever arms having cam surfaces thereon through which an output force from a second wall is transferred to an output member and added to the output of a first wall without the introduction of forces that may cause a rotative torque in the output member.

The invention will now be described with reference to the accompanying drawings wherein:

FIG. 1 is a sectional view of a tandem brake booster having lever means for transferring an output force from a movable wall along a vertical vector to an output member; and FIG. 2 is an end view of the movable showing the lever arms attached thereto;

FIG. 3 is a sectional view of the lever arm of FIG. 1 showing the relationship between the cam surfaces with the control valve in the rest position; and FIG. 4 is a sectional view of the FIG. 1 showing relationship between the cam surfaces with an input applied to the control valve.

The tandem brake booster 10 shown in FIG. 1 has a housing formed by joining as first shell 12 to a second shell 14 by a twist lock mechanism 16. A first wall 18 has a diaphragm 22 with a first bead 20 retained by the twist lock mechanism 16 and a second bead 24 located in the groove 26 in a hub mechanism 28. The first shell 12 and first wall 18 define a first chamber 30. The first chamber 30 is connected to a source of vacuum through check valve 32.

Hub 28 has a projection 34 that extends from wall 18 through an opening 36 in shell 14. A bearing-seal arrangement 38 located in opening 36 engages projection 34 to hold the hub 28 in axial alignment within housing 10.

A cylindrical member 40 which surrounds projection 34 has a first end 42 and a second end 44. In the rest position as shown, return spring 46 located in chamber 30 acts on hub 28 to position face 48 against the first end 42 and hold end 44 against end member 50 on shell 14. As seen in FIGS. 1 and 2, cylindrical member 40 has a first slot 52 and a second slot 54 located adjacent the first end 42. Each slot 52 and 54 has an apex 56 (only one shown) located at the bottom thereof that forms the fulcrum for a lever arrangement 62. Curved surfaces 58 and 60 which extend from apex 56 define the point of contact with the lever arrangement 62 after movement from the apex 56. The cylindrical member 40 has a series of slots 64 (only one is shown) that connect opening 66 in projection 34 with chamber 68.

A second wall 70 has a first bead 73 of diaphragm 74 retained by the twist lock arrangement 16 and a second bead 76 located in a groove 78 in a disc member 80. The disc member 80 has a seal 82 located on the inner surface thereof which surrounds surface 84 on cylindrical body 40. Diaphragm 74, disc 80, cylindrical member 40 and shell 14 effectively define the limits of chamber 68. Walls 18 and 70 and cylindrical member 40 define a chamber 72 between chambers 30 and 68. Chamber 30 is connected to a bore 77 by an opening 76, chamber 72 is connected to bore 77 by an opening 79, shown in phantom, and chamber 68 is connected to bore 77 by way of passage or slots 64 and opening 66.

As seen in FIG. 3, a control valve 81 located in bore 77 has a plunger 83 connected to a push rod 84. Movement of push rod 84 by an imput applied to pedal 86 allows spring 88 to position face 90 on the flexible pleated section of poppet member 92 against a vacuum seat 94. At the same time sleeve 96 and bore 77 define a passage 98 which provides for continual connection between passage 76 and opening 66. A spring 100 attached to push rod 84 holds sleeve 96 against a stop 102 to assure that face 90 of poppet member 92 is positioned adjacent vacuum seat 94 and that passage 98 is aligned with opening 66 and passage 76.

The lever arrangement 62 located in chamber 72 has a first arm 110 and a second arm 112. Each of the arms 110 and 112 has a first end 120 fixed to wall 62 by a pivot pin 116 located in a yoke 114 and a second end 122. The second end 122 has a cam surface 124 that located on a curved surface 126 in slots 128 on hub 28, only one of which is shown. The cam surface 124 has a contact point 120 that engages the apex 123 of corresponding cam or curved surface 126 in slot 128. The apex is located on the vertical center of the output push rod 132.

The tandem brake booster 10 operates in the following manner.

When an internal combustion engine is operating, vacuum is produced at the intake manifold. This vacuum is communicated through check valve 32 to evacuate air from chamber 30. With vacuum in chamber 30, air in chamber 68 is evacuated by way of slots 64, opening 66, passages 98 and 76 while air in chamber 72 is evacuated by way of opening 79, bore 75 (that portion of bore 77 adjacent seat 94 that is connected to passage 79), and into passage 76. With vacuum in chambers 30, 68 and 72, return spring 46 acts on and holds hub 28 against the second end 48 of the cylindrical member 40. Contact point 121 engages cam surface 124 to position the second wall 70 in the manner shown in FIGS. 1 and 3.

In response to an input force applied to pedal 86 push rod 84 moves plunger 83 and permits spring 88 to position face 90 on poppet member 92 on vacuum slot 94. Further movement of plunger 82 moves atmospheric seat 85 on plunger 83 away from face 90 to allow air present in bore 77 to enter chamber 72 by way of bore 75, and opening 79. With air in chamber 72, a pressure differential is created across the first and second wall 18 and 70.

The pressure differential across the first wall 18 creates a force that is directly transferred into the output push rod 132 for operating the master cylinder rod. At the same time, the pressure differential acting on the second wall 70 is transferred by way of the lever arrangement 62 into hub 28 where it is combined with the force from the first wall 18 to produce an output force for operating the master cylinder 200 corresponding to the input force applied to brake pedal 86.

As best seen in FIG. 4 which illustrates an operational position of the first and second walls 18 and 70 corresponding to an input force, the contact point 121 for the cam surface 124 on lever 110 and 112, remain in a vertical plane that passes through the axial center of the output push rod 132. The relationship between the engagement of cam surfaces 124 on lever arms 110 and 112 with the curved surface 126 in the bottom of slots 128 and the engagement of cam surface 111 with the apex 56 located at the bottom of slots 52 and 54 hold the contact points 121 in substantially the vertical plane throughout the entire stroke of the walls 18 and 70 to assure that rotational forces are not introduced into hub 28.

On termination of the input force, spring 100 moves atmosphere seat 85 on plunger 83 against face 90 to interrupt the communication of air into chamber 72. Further movement of the plunger 83 by spring 100 moves face 90 away from vacuum seat 94 to allow vacuum present in chamber 30 to evacuate air from chamber 72. As air is evacuated from chamber 72, the pressure differential across walls 18 and 70 is reduced and return spring 46 moves the wall 18 and 70 to the rest position shown in FIG. 1.

I claim:

1. In a tandem brake booster having first and second walls that move in opposite directions within a cavity to produce first and second output forces in response to an input force applied to a control member and a lever arrangement through which said second output force is presented to an output member and combined therein with said first output force to create a joint output force, the improvement comprising:

first and second arm means each of which has a first end connected to said second wall and a second end connected to said output member, each of said arm means having a first cam surface and a second cam surface;

a hub member having third and fourth cam surfaces thereon, each of the third and fourth cam surfaces having an apex located in a plane corresponding with the vertical center of output member, each of said third and fourth cam surfaces having symmetrical curved surfaces that extend from said apex; and a cylindrical member having a first end and a second end, said first end having first and second slots that extend to fifth and sixth cam surfaces, respectively, on the cylindrical member, said fifth and sixth cam surfaces each having a curved surface thereon, said first arm means being located in said first slot and said second arm means being located in said second slot, said first cam surfaces on said first and second arm means engaging said fifth and sixth cam surfaces, said second cam surfaces on said first and second arm means engaging said apex on said third and fourth cam surfaces, said second output force being transferred through said first and second arm means into said output member, said curved surface on said fifth and sixth cam surfaces modifying the lever ratio between said first and second ends of said first and second arm means thereof through which said second force is transmitted to said output member while said second cam surfaces on said first and second arm means engage said apex on said third and fourth cam surfaces to direct said second output force along a force vector substantially parallel to said output member to prevent the introduction of forces that may rotate said first wall and thereby reduce the effective value of the second output force.

2. The tandem brake booster, as recited in claim 1 further including a return spring that urges said first wall toward and into engagement with said first end of said cylindrical member in the absence of an input force.

3. The tandem brake booster, as recited in claim 1 wherein said second end on each of said first and second arm means extend past the axial center of said output member, said second cam surfaces engaging said third and fourth cam surfaces to maintain the transmission of said force vector into said output in a vertical plane substantially parallel to said axial center.

4. The tandem brake booster as recited in claim 1 wherein said control member is located in an annular projection that extends from a hub of said first wall, said extension having a first opening connected to a first chamber, a second opening connected to a second chamber and a third opening connected to a third chamber, said first wall separating said first chamber from said second chamber and said second wall separating said second chamber from said third chamber, said control member controlling the communication of fluid flow through said first, second and third openings to develop said first and second output force.

5. The tandem brake booster as recited in claim 4 wherein said control member includes:

a sleeve member having a first end secured to said annular projection and a second end;

a poppet member having a face on a flexible pleated section;

a plunger member connected to an input member;

a first spring for holding said sleeve against a stop to position said second end adjacent a vacuum seat; and a second spring for urging said plunger toward said face to allow fluid connection between said first, second and third chambers by way of said first, second and third openings.

6. The tandem brake booster as recited in claim 5 wherein said sleeve member includes a series of projections located on the external periphery to assure that an unrestricted flow path is established between said first and third openings at all times.

* * * * *